United States Patent [19]
Hasegawa et al.

[11] Patent Number: 5,893,438
[45] Date of Patent: Apr. 13, 1999

[54] CONTROL DEVICE FOR LOCKUP CLUTCH

[75] Inventors: Koichi Hasegawa; Akio Tsuura; Yoshinori Yamamoto; Kazuhiro Nakajima; Takashi Arai; Kouji Shibuya, all of Wako, Japan

[73] Assignee: Honda Giken Kogyo Kabushiki Kaisha, Tokyo, Japan

[21] Appl. No.: 08/736,039

[22] Filed: Oct. 21, 1996

[51] Int. Cl.$^6$ ............................................ F16D 33/00
[52] U.S. Cl. .................. 192/3.3; 192/3.31; 192/109 F; 477/169
[58] Field of Search ..................... 192/3.3, 109 F, 192/3.31; 477/169, 174, 175, 176

[56] References Cited

U.S. PATENT DOCUMENTS

| | | | |
|---|---|---|---|
| 5,086,894 | 2/1992 | Iizuka et al. | 192/3.3 X |
| 5,484,354 | 1/1996 | Vukovich et al. | 477/176 X |
| 5,491,635 | 2/1996 | Foeldi et al. | 477/176 X |
| 5,531,302 | 7/1996 | Koienig et al. | 192/3.3 |

FOREIGN PATENT DOCUMENTS 5-231531  9/1993  Japan.

*Primary Examiner*—Rodney H. Bonck
*Assistant Examiner*—Saul J. Rodriguez
*Attorney, Agent, or Firm*—Nikaido Marmelstein Murray & Oram, LLP

[57] ABSTRACT

A facing surface of a clutch piston is previously moved to a position just before it abuts against an inner surface of a torque converter cover, or a position in which it extremely slightly abuts against the inner surface of the torque converter cover by outputting an initial engage pressure YMIN set in accordance with a vehicle speed and the like only for a predetermined time TMPS prior to the start of engagement of a lockup clutch. When the engagement of the lockup clutch is started, the engage pressure is gradually increased. When the engage pressure approaches a target pressure set in accordance with the target speed ratio, a feedback control of the engage pressure is carried out such that the actual speed ratio of the torque converter is converged to the target speed ratio. Thus, when the lockup clutch of the torque converter is brought into an engaged state, the responsiveness can be enhanced while preventing the generation of a shock.

2 Claims, 9 Drawing Sheets

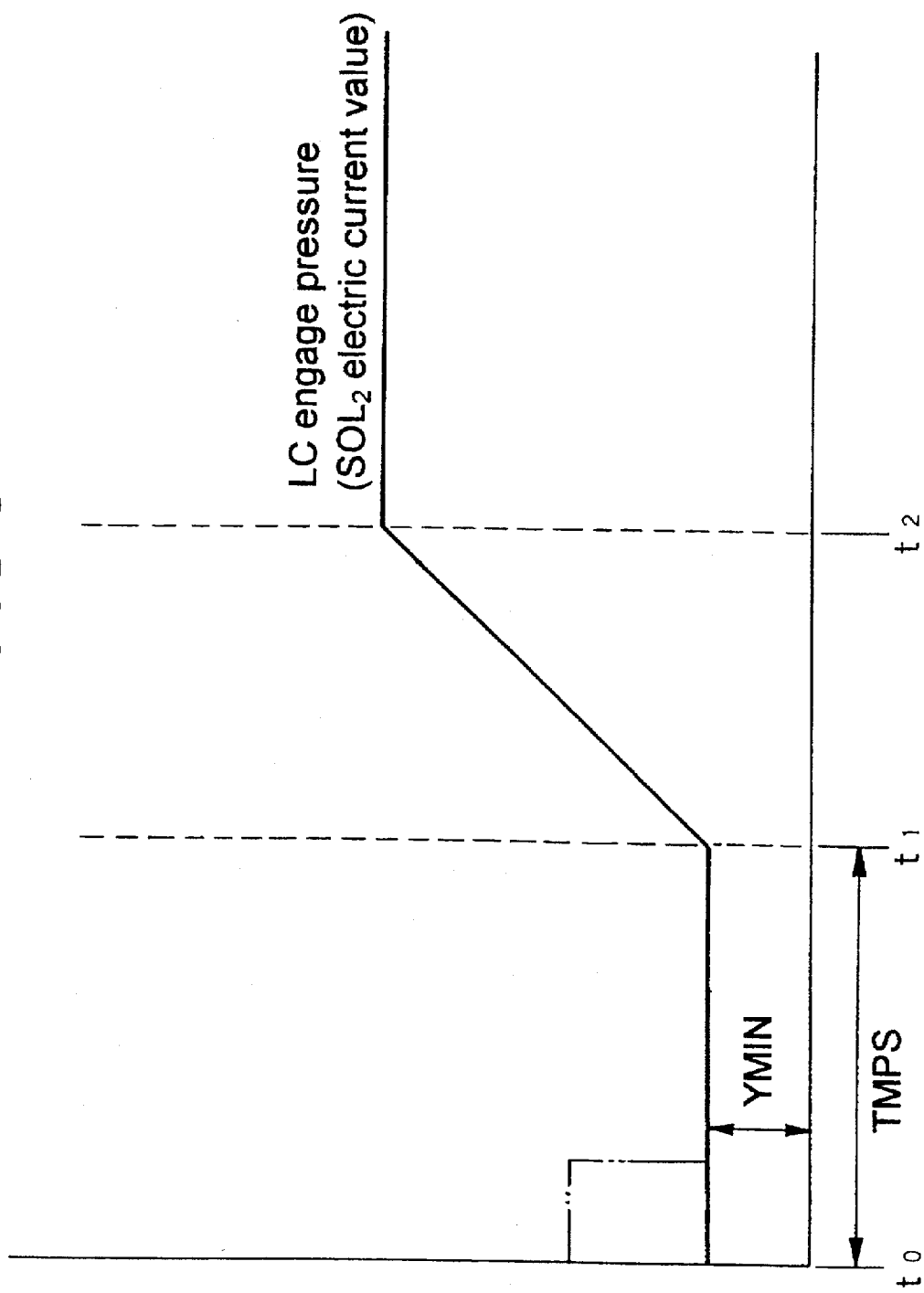

CONTROL DEVICE FOR LOCKUP CLUTCH

BACKGROUND OF THE INVENTION

1. Field of the Invention

The present invention relates to a control device for a lockup clutch for controlling the speed ratio of a torque converter of an automatic transmission in accordance with the operational state of a vehicle.

2. Description of the Related Art

Such a control device is known, for example, from Japanese Patent Application Laid-open No.5-231531. With this control device, an engage pressure is previously gradually increased by a feed-forward control before the engagement of the lockup clutch is started, and when the engagement of the lockup clutch is started, the gradually increased engage pressure is maintained for a given time and then, feedback-controlled such that the actual speed ratio of the torque converter is converged to a target speed ratio, thereby preventing the generation of a shock upon the engagement of the lockup clutch.

However, the known device suffers from a problem that at the start of the engagement of the lockup clutch, it is difficult to retain a clutch piston at an engagement starting position (a position just before a facing surface of the clutch piston abuts against an inner surface of a torque converter cover, or a position in which the facing surface of the clutch piston extremely slightly abuts against the inner surface of the torque converter cover). For this reason, the timing of the engagement is displaced, resulting in a reduced responsiveness.

SUMMARY OF THE INVENTION

Accordingly, it is an object of the present invention to enhance the responsiveness while preventing the generation of a shock, when the lockup clutch of the torque converter is brought into an engaged state.

To achieve the above object, according to the present invention, there is provided a control device for a lockup clutch having a control area in which an engage pressure of a lockup clutch is controlled such that an actual speed ratio of a torque converter of an automatic transmission is equalized to a target speed ratio, the control device comprising: an initial engage pressure calculating means for calculating an initial engage pressure required for stroking a clutch piston of the lockup clutch to an engagement starting position and for retaining the clutch piston at the engagement starting position, based on the number of rotations of a preselected rotary member of the automatic transmission; an operational state determining means for determining an operational state of a vehicle; and an engage pressure control means for controlling an engage pressure of the lockup clutch such that the actual speed ratio of the torque converter is equalized to the predetermined target speed ratio, after the initial engage pressure calculated in the initial engage pressure calculating means is output for a predetermined time, when the operational state determining means determines that the operational state is shifted from out of the control area into the control area.

With such an arrangement, it is possible not only to suppress the shock generated upon the engagement to a minimum, but also to quickly bring the lockup clutch into an engaged state to enhance the responsiveness.

The above and other objects, features and advantages of the invention will become apparent from the following description of a preferred embodiment taken in conjunction with the accompanying drawings.

BRIEF DESCRIPTION OF THE DRAWINGS

FIGS. 1 to 9 show an embodiment of the present invention, wherein:

FIG. 1 is a diagrammatic illustration of the entire arrangement of a vehicle equipped with a control device for a lockup clutch;

FIG. 2 is a block diagram of an electronic control unit;

FIG. 3 is a block diagram illustrating a circuit arrangement of a lockup clutch;

FIG. 4 is a hydraulic circuit illustration of a torque converter (when the lockup clutch is in its OFF state);

FIG. 5 is a hydraulic circuit illustration of the torque converter (when the lockup clutch is in its ON state);

FIG. 6 a flow chart of a main routine;

FIG. 7 is a flow chart of a lockup clutch ON job routine;

FIG. 8 is a map illustrating control areas; and

FIG. 9 is a time chart for explaining the operation.

DETAILED DESCRIPTION OF THE PREFERRED EMBODIMENT

Figure 1:
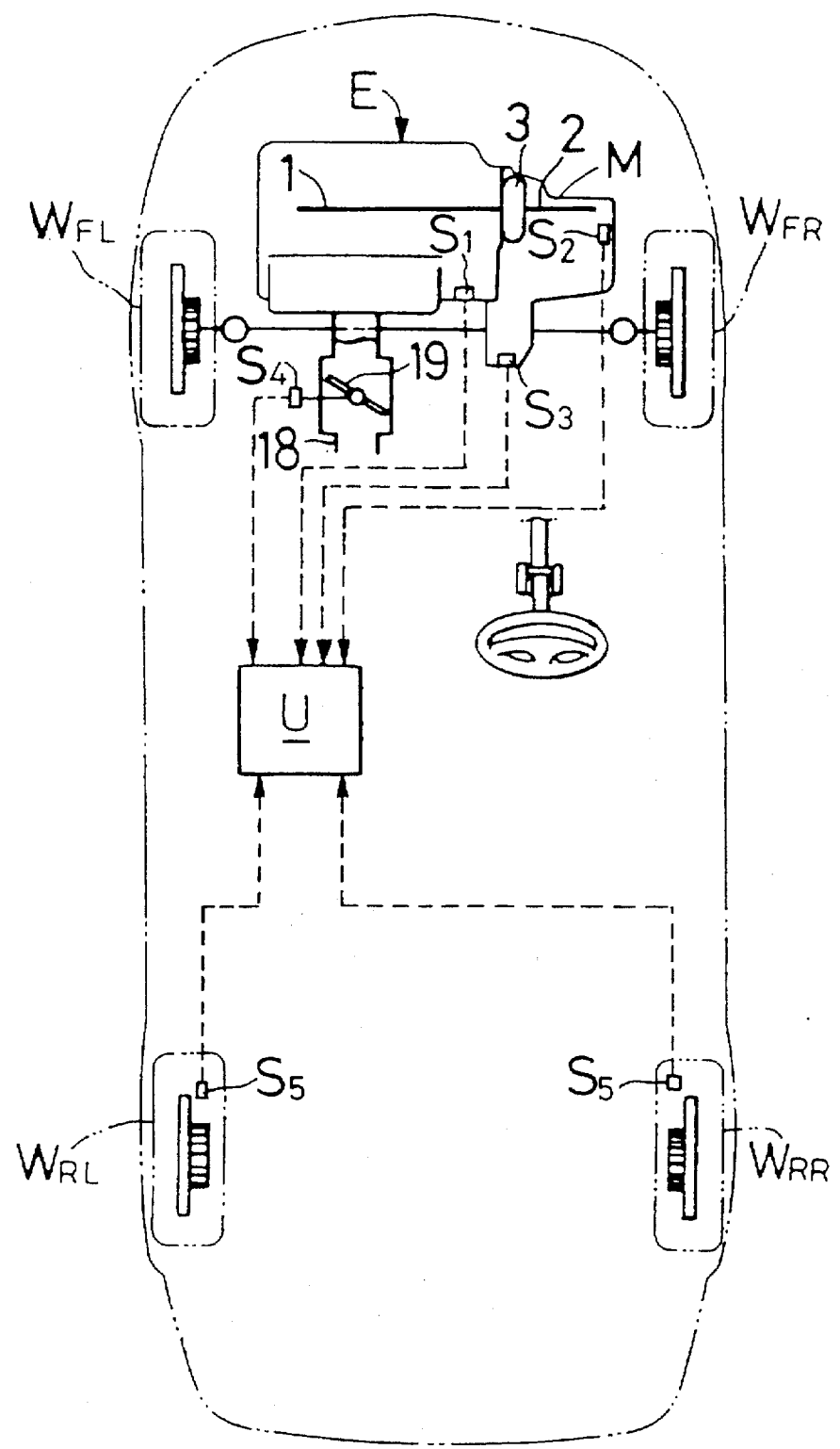

Referring to FIG. 1, there is shown a front wheel drive vehicle. The vehicle includes a pair of left and right driven wheels $W_{FL}$ and $W_{FR}$ to which a torque of an engine E is transmitted through an automatic transmission M, and a pair of left and right follower wheels $W_{RL}$ and $W_{RR}$ which are rotated with traveling of the vehicle. A known torque converter 3 is interposed between a crankshaft 1 of the engine E and a main shaft 2 of the automatic transmission M.

Figure 4:
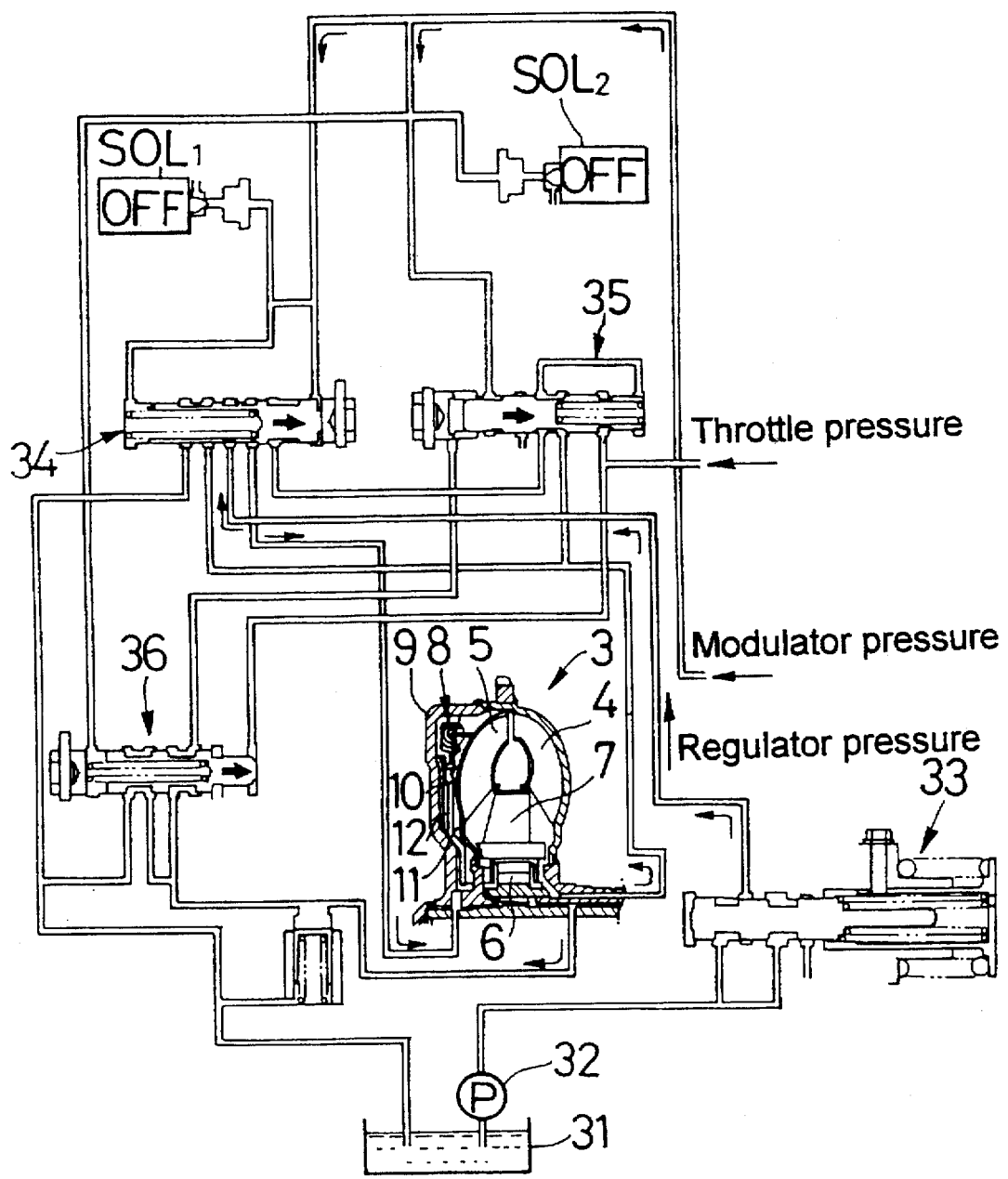

As shown in FIG. 4, the torque converter 3 includes a pump 4 connected to the crankshaft 1, a turbine 5 connected to the main shaft 2, a stator 7 supported to a fixing portion through a one-way clutch 6, and a lockup clutch 8 capable of coupling the pump 4 and the turbine 5 to each other.

The lockup clutch 8 includes a clutch piston 10 capable of abutting against an inner surface of the torque converter cover 9, and a first oil chamber 11 and a second oil chamber 12 are defined on opposite sides of the clutch piston 10. When A pressure oil is supplied to the first oil chamber 11 to cause the clutch piston 10 to be put into abutment against the torque converter cover 9, the lockup clutch 8 is brought into its engaged state, thereby permitting a torque of the crankshaft 1 to be transmitted directly to the main shaft 2. When the pressure oil is supplied to the second oil chamber 12 to move the clutch piston 10 away from the torque converter cover 9, the lockup clutch is brought into its disengaged state to cut off the mechanical connection of the crankshaft 1 and the main shaft 2.

A hydraulic circuit of the torque converter 3 includes an oil pump 32 for pumping a working oil from an oil tank 31, a regulator valve 33 for regulating the working oil from the oil pump 32 to a regulator pressure, and a lockup shift valve 34 adapted to transmit the regulator pressure to the second oil chamber 12 in the torque converter 3 and to connect the first oil chamber 11 to the oil tank 31 when the lockup clutch 8 is in its non-engaged state, and to transmit the regulator pressure to the first oil chamber 11 in the torque converter 3 and to connect the second oil chamber 12 to a lockup control valve 35 which will be described hereinafter, when the lockup clutch 8 is in its engaged state. The lockup control valve 35 controls the engage force of the lockup clutch 8 by escaping the pressure of the working oil supplied thereto from the second oil chamber 12 through the lockup shift valve 34 and regulating the pressure in the second oil chamber 12. The hydraulic circuit further includes a lockup timing valve 36 which is operated by a throttle pressure during traveling of the vehicle at a high speed to operate the lockup control valve 35, thereby opening the second oil chamber 12 to the atmosphere to bring the lockup clutch into a completely engaged state.

A first solenoid valve $SOL_1$ is controlled between ON/OFF states. When the first solenoid valve $SOL_1$ is in the OFF state, it permits a modulator pressure to be transmitted to a left end of the lockup shift valve 34 to move a spool of the lockup shift valve 34 rightwards, thereby transmitting the regulator pressure to be transmitted to the second oil chamber 12 in the torque converter 3, while at the same time, connecting the first oil chamber 11 to the oil tank 31, thus releasing the engagement of the lockup clutch 8. When the first solenoid valve $SOL_1$ is in the ON state, it permits the modulator pressure to be escaped to move the spool of the lockup shift valve 34 leftwards, thereby transmitting the regulator pressure to the first oil chamber 11 in the torque converter 3, while at the same time, connecting the second oil chamber 12 to the lockup control valve 35, thus bringing the lockup clutch 8 into the engaged state.

A second solenoid valve $SOL_2$ is a linear solenoid valve. When the second solenoid valve $SOL_2$ is in its OFF state, it permits the spool of the lockup control valve 35 and the spool of the lockup timing valve 36 to be biased rightwards by the modulator pressure, and when the second solenoid valve $SOL_2$ is in its ON state, it permits the modulator pressure to escape to release the biasing force. The opening degree of the lockup control valve 35 is capable of being controlled continuously by varying the value of an electric current supplied to the second solenoid valve $SOL_2$. If the opening degree of the lockup control valve 35 is increased, the back pressure in the second oil chamber 12 in the torque converter 3 is decreased to increase the engage force of the lockup clutch 8. On the other hand, if the opening degree of the lockup control valve 35 is increased, the back pressure in the second oil chamber 12 in the torque converter 3 is increased to decrease the engage force of the lockup clutch 8.

Returning to FIG. 1, the engine E is provided with an engine revolution-number detecting means $S_1$ for detecting a number Ne of revolutions per unit of time of the engine (i.e. number of revolutions of crankshaft 1), and the automatic transmission M is provided with a main shaft rotation-number detecting means $S_2$ for detecting a number Nm of rotations of the main shaft, and a shift position detecting means $S_3$ for detecting a shift position P. A throttle valve 19 incorporated in an intake passage 18 of the engine E is provided with a throttle opening degree detecting means $S_4$ for detecting a throttle opening degree $\theta_{TH}$. Further, the left and right rear wheels $W_{RL}$ and $W_{RR}$ which are the follower wheels are provided with vehicle speed detecting means $S_5$, $S_5$ for detecting a vehicle speed V.

Figure 2:
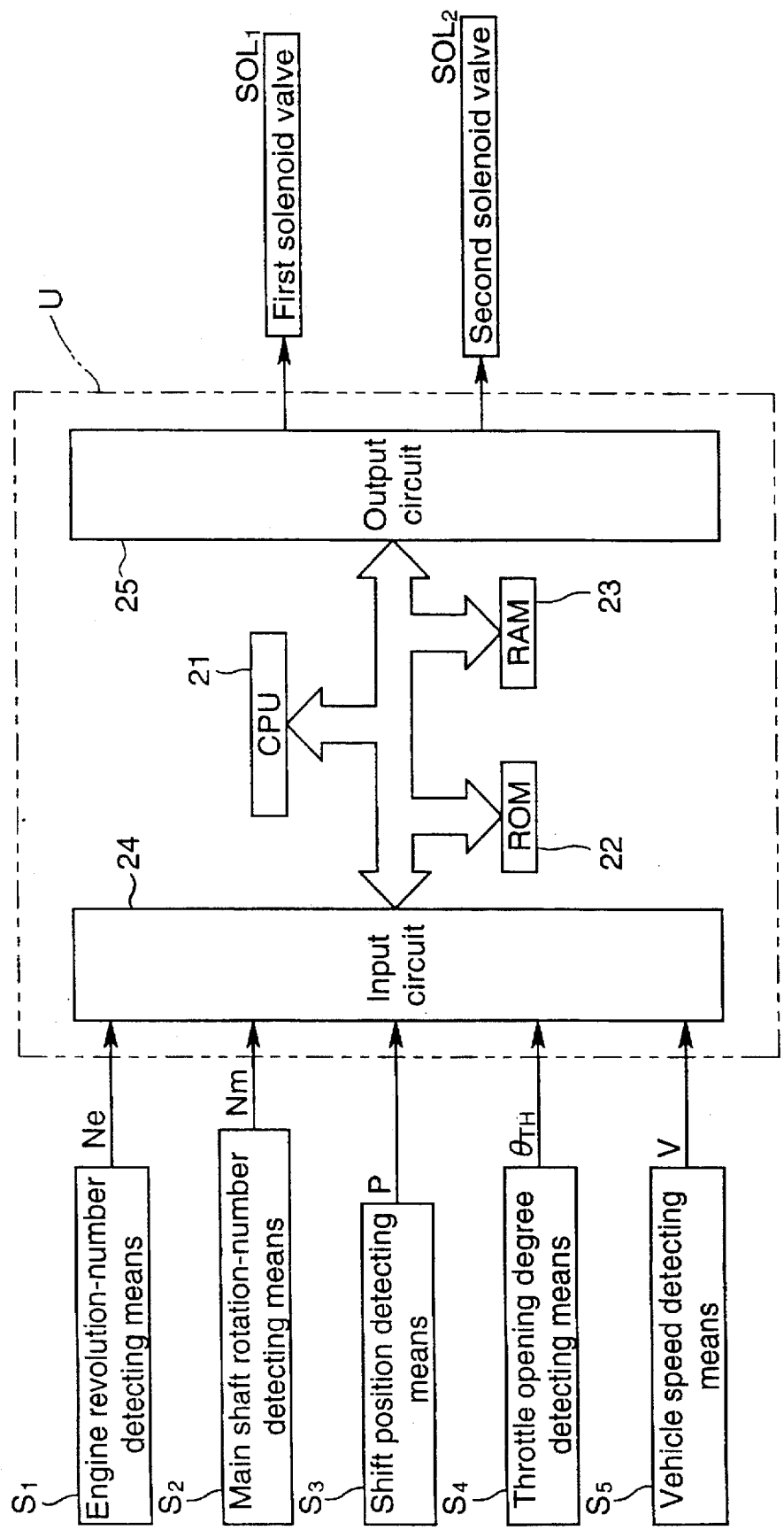

FIG. 2 shows an electronic control unit U for mathematically processing signals from the various detecting means according to a control program and driving the first and second solenoid valves $SOL_1$ and $SOL_2$ to control the speed ratio of the torque converter 3. The electronic control unit U includes a central processing unit (CPU) 21 for carrying out the mathematical processing, a read-only memory (ROM) 22 having data such as the control program and various tables stored therein, a random access memory (RAM) 23 which temporarily stores the output signals from the various detecting means and the results of the mathematical processings, an input circuit 24 to which the various detecting means, i.e., the engine revolution-number detecting means $S_1$, the main shaft rotation-number detecting means $S_2$, the shift position detecting means $S_3$, the throttle opening degree detecting means $S_4$ and the vehicle speed detecting means $S_5$, $S_5$ are connected, and an output circuit 25 to which the first and second solenoid valves $SOL_1$ and $SOL_2$ are connected.

The electronic control unit U mathematically processes the various signals input thereto through the input section 24 and the data and the like stored in the read-only memory 22 in the central processing unit 21 according to the control program, and finally controls the value of electric current supplied to the first and second solenoid valves $SOL_1$ and $SOL_2$ through the output section 25. Thus, the engage force of the lockup clutch 8 can be varied to control the speed ratio of the torque converter 3.

Figure 3:
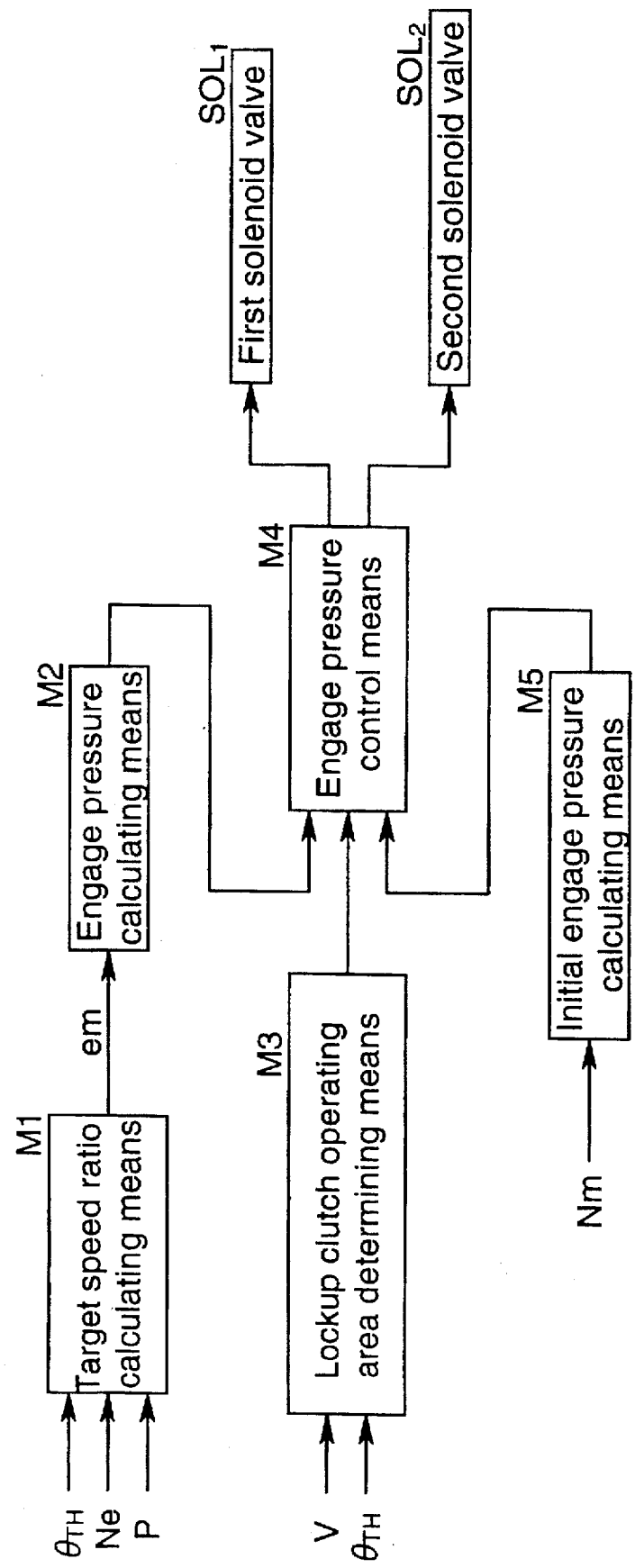

FIG. 3 is a block diagram showing the circuit arrangement of a control device for a lockup clutch. The control device for the lockup clutch includes a target speed ratio calculating means M1, an engage pressure calculating means M2, a lockup clutch operating area determining means M3, an engage pressure control means M4 and an initial engage pressure calculating means M5.

Figure 6:
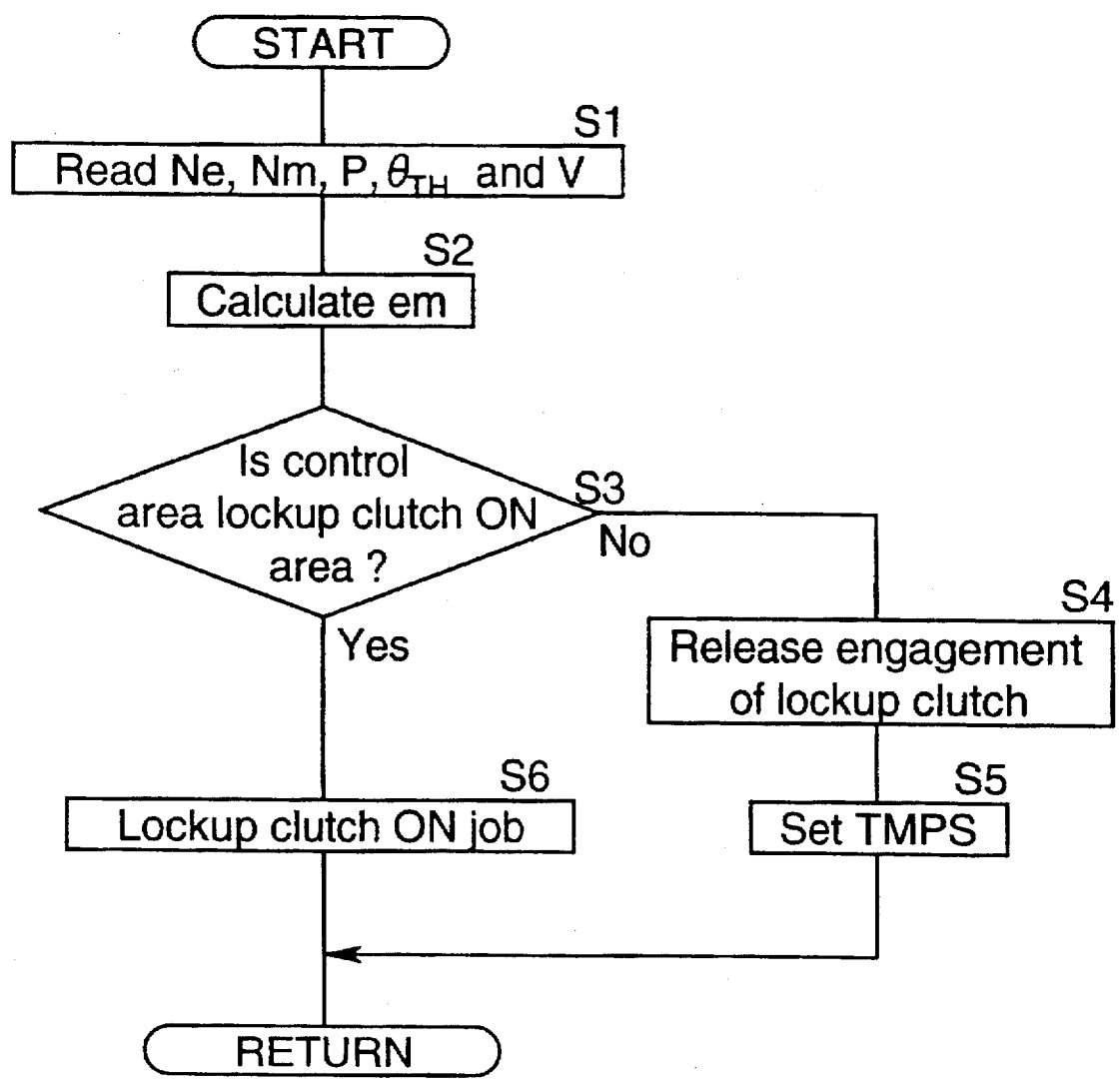

The operation of the embodiment of the present invention will be described below mainly with reference to the block diagram in FIG. 3 and flow charts in FIGS. 6 and 7.

First, the following values are read (at step S1): an engine revolution-number per unit of time Ne detected by the engine revolution-number detecting means $S_1$; a main shaft rotation-number Nm detected by the main shaft rotation-number per unit of time detecting means $S_2$; a shift position P detected by the shift position detecting means $S_3$, a throttle opening degree $\theta_{TH}$ detected by the throttle opening degree detecting means $S_4$, and a vehicle speed V detected by the vehicle speed detecting means $S_5$, $S_5$.

Then, in the target speed ratio calculating means M1, a target speed ratio em of the torque converter 3 is calculated based on parameters representing an operational state of the vehicle, i.e., the throttle opening degree $\theta_{TH}$, the engine revolution-number Ne and the shift position P (at step s2). An actual speed ratio e of the torque converter 3 is given by (main shaft rotation-number Nm)/(engine revolution-number Ne), and the target speed ratio em is a target value for the actual speed ratio e. The target speed ratio em is provided, for example, by table searching, and is previously set at a value suitable to prevent the generation of a surging of the torque converter 3 and/or a closed cluttering and moreover, to provide enhancements in specific fuel consumption and power characteristic.

Figure 8:
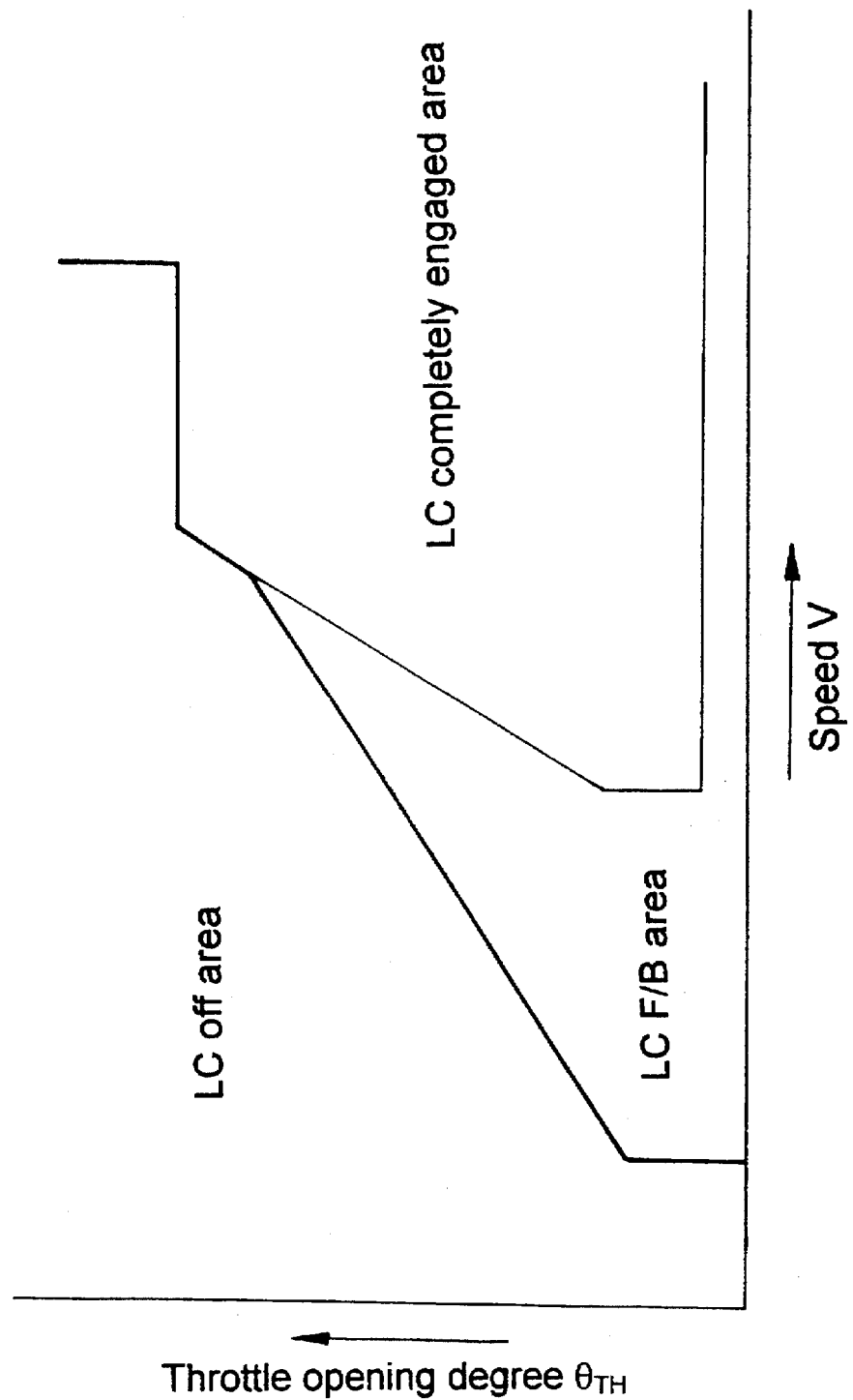

The lockup clutch operating area determining means M3 determines an operating area of the lockup clutch 8 from a map shown in FIG. 8, based on the parameters representing the operational state of the vehicle, i.e., the vehicle speed V and the throttle opening degree $\theta_{TH}$. The operating area is classified into three areas: a lockup clutch OFF area established in a relatively low vehicle speed range, a lockup clutch completely-engaged area established in a relative high vehicle speed range; and a lockup clutch feedback control area established between both such area sections. The lockup clutch completely-engaged area and the lockup clutch feedback control area constitute a lockup clutch ON area together.

Figure 7:
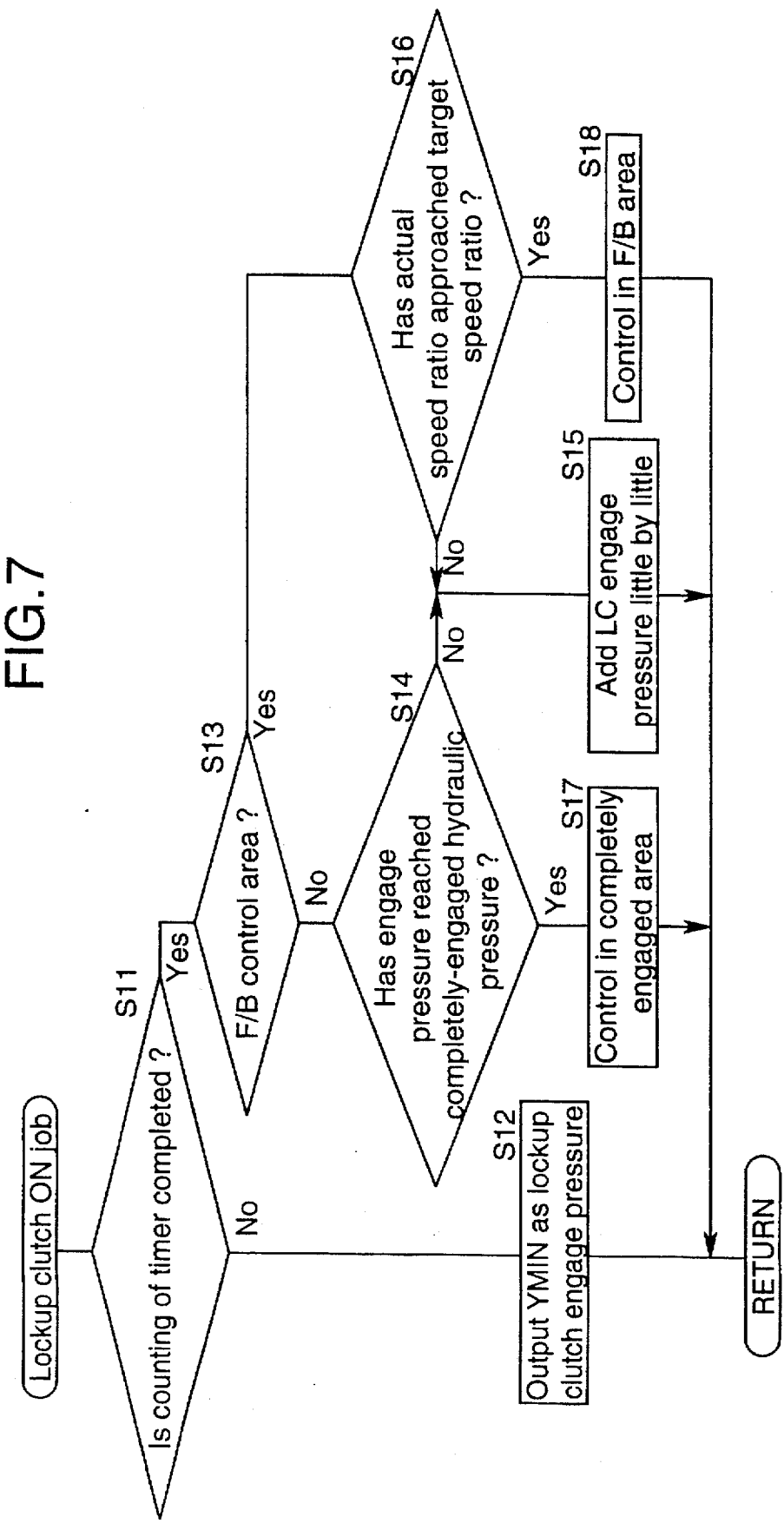

If the area determined in the lockup clutch operating area determining means M3 is the lockup clutch ON area, i.e., any of the lockup clutch completely-engaged area and the lockup clutch feedback control area (at step S3), a lockup clutch ON job shown in the flow chart in FIG. 7 is carried out (at step S6).

If the area determined in the lockup clutch operating area determining means M3 is not the lockup clutch ON area, i.e., is the lockup clutch OFF area, the engagement of the lockup clutch 8 is released (at step S4), and a timer TMPS is set (at step S5).

The releasing of the engagement of the lockup clutch 8 at step S4 is conducted by controlling the first and second solenoid valves $SOL_1$ and $SOL_2$ by the engage pressure control means M4 (which will be described hereinafter). More specifically, by turning OFF the first solenoid valve $SOL_1$, as shown in FIG. 4, the regulator pressure is transmitted to the second oil chamber 12 in the torque converter 3, and the first oil chamber 11 is connected to the oil tank 31. As a result, the clutch piston 10 of the lockup clutch 8 is moved rightwards away from the inner surface of the torque converter cover 9, thereby releasing the engagement of the lockup clutch 8.

A subroutine of the step S6 (the lockup clutch ON job) will be described below with reference to the flow chart in FIG. 7 and a time chart in FIG. 9.

If the area is shifted from the lockup clutch OFF area to the ON area at step S3, the engage pressure control means M4 supplies an initial engage current value for generating an initial engage pressure YMIN in the lockup clutch to the second solenoid valve $SOL_2$ (at step S12) for a period of time until the counting of the timer TMPS set at step S5 is completed (at step S11). If the area is shifted from the lockup clutch OFF area to the ON area, the engage force control means M4 simultaneously supplies the current to the first solenoid valve $SOL_2$, whereby the first solenoid valve $SOL_2$ is switched from the OFF state to the ON state.

The initial engage pressure YMIN is calculated by a table searching in the initial engage pressure calculating means M5 based on the vehicle speed V and the shift position P (i.e., based on the number Nm of rotations of the main shaft of the automatic transmission M). The magnitude of the initial engage pressure YMIN is set as described below.

When the first solenoid valve $SOL_1$ is in its OFF state and the lockup clutch 8 is in its non-engaged state, there is a predetermined gap (e.g., in a range of 0.8 to 1.2 mm) between a facing surface of the clutch piston 10 of the lockup clutch 8 and the inner surface of the torque converter cover 9. This gap is biased in an enlarging direction by a centrifugal force acting on the working oil remaining in the second oil chamber 12 (i.e., the oil chamber defined between the clutch piston 10 and the torque converter cover 9). Therefore, when the lockup clutch 8 is brought into its engaged state, it is required that the clutch piston 10 is stroked through a distance corresponding to the gap to abut against the inner surface of the torque converter cover 9, resulting in a problem that a shock is generated at a moment that the lockup clutch is put into its engaged state, or a response lag is generated.

Thereupon, if the facing surface of the clutch piston 10 is previously moved to a position just before it is brought into contact with the inner surface of the torque converter cover 9 (an initial engagement position) by providing the initial engage pressure YMIN in accordance with the magnitude of the number of rotations of the main shaft, i.e., in accordance with the magnitude of the centrifugal force acting on the working oil within the second oil chamber 12, the facing surface of the clutch piston 10 is softly and promptly put into abutment against the inner surface of the torque converter cover 9 upon the subsequent engagement of the lockup clutch 8. Thus, it is possible to avoid the generation of a shock and/or the generation of a response lag.

The initial engagement position is not limited to the position just before it is brought into contact with the inner surface of the torque converter cover 9 and may be a position in which even if the facing surface of the clutch piston 10 is slightly contacted with the inner surface of the torque converter cover 9, the substantial transmission of the torque is not conducted.

If the counting of the timer TMPS is completed at S11, it is determined whether the area is the lockup clutch feedback control area (at step S13) if the area is not the lockup clutch feedback control area and is the lockup clutch completely engaged area, the electric current value supplied to the second solenoid valve $SOL_2$ is gradually increased by adding a predetermined value to the electric current value in every loop, until the engage pressure is equalized to a value required for the complete engagement. Likewise, if the area is the lockup clutch feedback control area at step S13, the electric current value supplied to the second solenoid valve $SOL_2$ is gradually increased by adding the predetermined value to the electric current value in every loop, until the actual speed ratio e of the torque converter 3 approaches the target speed ratio em calculated in the target speed ratio calculating means M1 (at step S16). The larger the target speed ratio em, the larger the amount added to the electric current value is set.

If the engage pressure of the lockup clutch 8 reaches a complete-engagement hydraulic pressure at step S14, the control in the lockup clutch completely-engaged area is carried out at step S17. In the control in the lockup clutch completely-engaged area, the electric current value of the second solenoid valve $SOL_2$ is fixed to a maximum value. As a result, the spool of the lockup timing valve 36 is moved leftwards, and the spool of the lockup control valve 35 is moved leftwards, thereby causing the second oil chamber 12 in the torque converter 3 to be opened to the atmosphere, such that the back pressure of the clutch piston 10 disappears, and the lockup clutch is brought into a completely engaged state.

Figure 5:
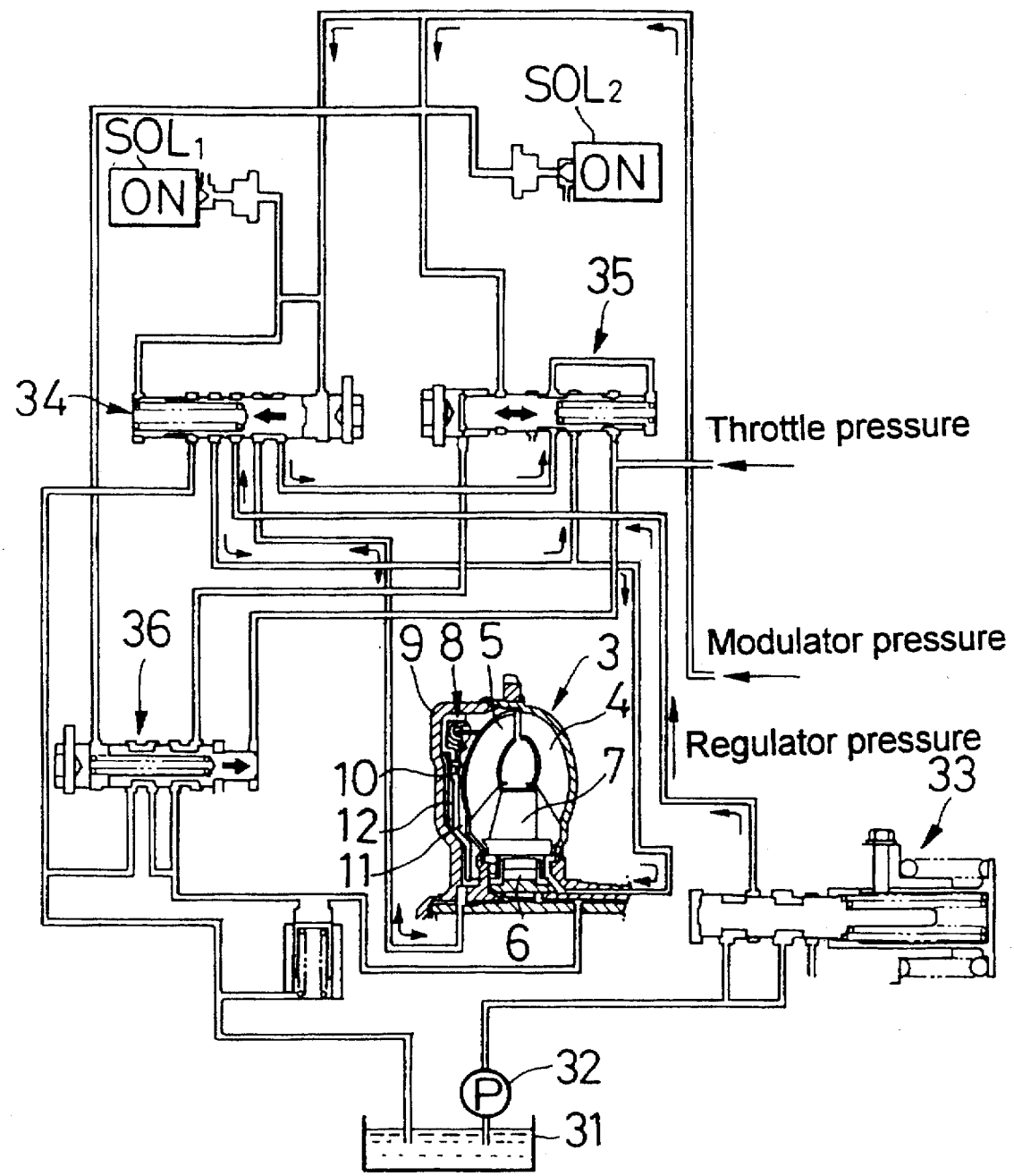

When the actual speed ratio e approaches the target speed ratio em at step S16, the control in the lockup clutch feedback control area is carried out. In the lockup clutch feedback control area, the electric current value for the second solenoid valve $SOL_2$ is gradually increased to converge the actual speed ratio e to the target speed ratio em. As a result, the spool of the lockup control valve 35 is moved to a laterally central position in FIG. 5 to open the second oil chamber 12 in the torque converter 3 to the atmosphere with a predetermined opening degree. Thus, the back pressure of the clutch piston 10 is regulated, and the engage force of the lockup clutch 8 is controlled to converge the actual speed ratio e to the target speed ratio em.

If the engage force of the lockup clutch 8 is feedback-controlled to converge the actual speed ratio e to the target speed ratio em without outputting of the initial engage pressure YMIN, the feedback control is started before the facing surface of the clutch piston 10 is moved to the initial engagement position just before the facing surface of the clutch piston 10 is contacted with the inner surface of the torque converter cover 9. Namely, the feedback control is carried out from a state in which the actual speed ratio e is small and the slipping is large, toward an engagement-side target speed ratio em and hence, the larger the deviation between the actual speed ratio and the target speed ratio, the higher the engage pressure signal is output by the feedback control. As a result, there is a possibility that the actual speed ratio e hunts to produce a variation in number Ne of revolutions of the engine, thereby degrading the control response or the driveability.

On the other hand, according to the present invention, in bringing the lockup clutch 8 into the engaged state, the facing surface of the clutch piston 10 is previously moved to the initial engagement position just before it is contacted with the inner surface of the torque converter cover 9 by outputting of the initial engage pressure YMIN. Therefore, when the lockup clutch 8 is brought into the engaged state, it is possible not only to prevent the facing surface of the clutch piston 10 from colliding against the inner surface of the torque converter cover 9 to avoid the generation of a shock, but also to bring the lockup clutch 8 into the engaged state quickly, thereby enhancing the responsiveness. Moreover, it is possible to avoid the degradation of the control responsiveness and the driveability.

Although the embodiment of the present invention has been described in detail, it will be understood that the present invention is not limited to the above-described embodiment, and various modifications in design may be made without departing from the subject matter and scope of the invention defined in claims.

For example, the initial engage pressure YMIN is calculated substantially based on the number Nm of rotations of the main shaft in the embodiment, but may be calculated based on the number Ne of revolutions of the engine.

When the area is shifted from the lockup clutch OFF area to the lockup clutch ON area, it is appropriate that a constant initial engage pressure YMIN is output for a TMPS time, as shown by a solid line in FIG. 9. However, when the area is once shifted from the lockup clutch ON area to the lockup clutch OFF area under a predetermined condition and then returned again to the lockup clutch ON area (for example, when the shifting is carried out), the rising of the initial engage pressure YMIN is increased as shown by a dashed line in FIG. 9 and then, a constant value is maintained, leading to an enhanced feeling. Therefore, the initial engage pressure YMIN can be also changed in accordance with the vehicle speed, and in a vehicle speed area in which the shifting is conducted, an initial engage pressure YMIN shown by a dashed line in FIG. 9 can be set.

In addition, it is possible to correct the initial engage pressure YMIN in accordance with the oil temperature. Specifically, the lower the oil temperature, the more the responsiveness is reduced and hence, it is desirable that the initial engage pressure YMIN is set at a large value. Further, the count time of the timer TMPS may be variable, and it is desirable that when the number Nm of rotations of the main shaft or the number of revolutions of the engine is higher, the count time is set at a longer value, and when the oil temperature is lower, the count time is set at a longer value.

Additionally, when the lockup clutch 8 is in an operational state in which it is repeatedly turned ON and OFF, the initial engage pressure YMIN and the count time of the timer TMPS may be corrected.

What is claimed is:

1. A control device for a lockup clutch having a control area in which an engage pressure of a lockup clutch is controlled such that an actual speed ratio of a torque converter of an automatic transmission is equalized to a target speed ratio, said control device comprising:

an initial engage pressure calculating means for calculating an initial engage pressure required for stroking a clutch piston of the lockup clutch to an engagement starting position and for retaining said clutch piston at said engagement starting position, based on the rate of the number of rotations of a preselected rotary member of the automatic transmission;

an operational state determining means for determining an operational state of a vehicle; and an engage pressure control means for controlling engage pressure of the lockup clutch such that the actual speed ratio of said torque converter is equalized to said predetermined target speed ratio, after the initial engage pressure calculated in said initial engage pressure calculating means is output for a predetermined time, when said operational state determining means determines that the operational state is shifted from out of said control area into said control area, wherein said lockup clutch has an OFF area in which the lockup clutch is disengaged completely and an ON area in which the lockup clutch is engaged at least partly, and said initial engage pressure calculating means retains said clutch piston of the lockup clutch at said engagement starting position when said engage pressure control means determines that the lockup clutch should be shifted from said OFF area to said ON area, and wherein said ON area includes a lockup clutch feedback area and a lockup clutch completely engaged area.

2. A control device according to claim 1, wherein said engagement starting position of the clutch piston is a position where no substantial torque transmission is conducted through said lockup clutch.

* * * * *